United States Patent [19]
Nishikata et al.

[11] Patent Number: 5,699,546
[45] Date of Patent: Dec. 16, 1997

[54] MEMORY MANAGEMENT CONTROL DEVICE AND METHOD FOR PERFORMING REWRITE ON INTERNAL NON-VOLATILE MEMORY ACCORDING TO AN OPERATION STATE DETERMINATION

[75] Inventors: Akinobu Nishikata, Fujisawa; Tomobumi Nakayama, Inagi; Yoshihiko Suzuki, Tokyo; Isamu Sato, Yokohama; Hisatsugu Tahara, Kawasaki; Noriyoshi Chizawa, Yokohama; Shokyo Koh, Kawasaki; Masafumi Kamei, Shakujii-machi; Akio Ito, Machida; Hirohiko Tashiro, Yokohama, all of Japan

[73] Assignee: Canon Kabushiki Kaisha, Tokyo, Japan

[21] Appl. No.: 522,915

[22] Filed: Sep. 1, 1995

[30] Foreign Application Priority Data

Sep. 2, 1994 [JP] Japan ................ 6-210258

[51] Int. Cl.[6] ............................... G06F 13/00
[52] U.S. Cl. ............ 395/430; 395/486; 395/492; 395/429; 364/DIG. 1
[58] Field of Search ................ 395/429, 430, 395/486, 492

[56] References Cited

U.S. PATENT DOCUMENTS

| 5,432,927 | 7/1995 | Grote et al. | 395/430 |
| 5,446,522 | 8/1995 | Tahara et al. | 355/202 |
| 5,495,593 | 2/1996 | Elmer et al. | 395/430 |
| 5,509,134 | 4/1996 | Fandrich et al. | 395/430 |

Primary Examiner—Frank J. Asta
Attorney, Agent, or Firm—Fitzpatrick, Cella, Harper & Scinto

[57] ABSTRACT

A memory management control device and a memory management control method capable of preventing run away of an image processing apparatus caused by a rewrite to a memory, are provided. In rewriting a program stored in a flash memory 402 of a controller 400 included in an image processing apparatus, an operating state detector 500 detects the operating state of the image processing apparatus and transmits the detection result to an external apparatus 9. On the basis of this detected operating state, the external apparatus 9 performs rewrite control for the flash memory 402. If the image processing apparatus is in operation, or is in an intermediate state, an abnormal state, or a wait state, a rewrite action is executed after the state is canceled.

74 Claims, 13 Drawing Sheets

MEMORY MANAGEMENT CONTROL DEVICE AND METHOD FOR PERFORMING REWRITE ON INTERNAL NON-VOLATILE MEMORY ACCORDING TO AN OPERATION STATE DETERMINATION

BACKGROUND OF THE INVENTION

The present invention relates to a memory management control device and a memory management control method of managing an internal memory of an image processing apparatus.

By convention, a mask ROM or an EPROM is used as a program memory of an image processing apparatus. As a memory which supplants these memories, electrically erasable nonvolatile memories (e.g., an EEPROM and a flash memory) have been developed, and the use of these memories in an image processing apparatus has been proposed. When this type of a memory is used, it is possible to perform an on-board rewrite, instead of replacing ROMs, in changing or correcting programs upon version up or addition of options. It is also possible to perform a rewrite action from a remote place by using communications.

If, however, a rewrite to a nonvolatile memory is performed while an image processing apparatus is in operation or in an intermediate state, the apparatus may run away. Also, in some instances the user does not want a memory to be rewritten.

SUMMARY OF THE INVENTION

The present invention has been made to solve the above conventional problems and has as its object to provide a memory management control device and a memory management control method capable of reliably determining the rewrite enable timing of a memory and rewriting the memory at the determined rewrite enable timing.

It is another object of the present invention to provide a memory management control device and a memory management control method capable of preventing run away of an image processing apparatus caused by a rewrite to a memory.

It is still another object of the present invention to provide a memory management control device and a memory management control method capable of reliably determining the rewrite enable timing of a memory on the basis of whether an image processing apparatus is in a normal operating state or an abnormal state, so that the memory is not inadvertently rewritten while the image processing apparatus is processing images, thereby reliably rewriting the memory and preventing run away of the apparatus.

It is still another object of the present invention to provide a memory management control device capable of rewriting a memory immediately after the memory rewrite enable timing is reached.

In order to achieve the above objects of the present invention, there is provided a memory management control device for managing an internal memory of an image processing apparatus, comprising determining means for determining an operating state of the image processing apparatus, and control means for performing rewrite control for the memory on the basis of the determination result of the determining means.

The memory as an object of the rewrite control is a nonvolatile memory. The determining means determines whether the image processing apparatus is in operation, and the control means inhibits a memory rewrite if the determining means determines that the image processing apparatus is in operation. The determining means determines whether the image processing apparatus is in an intermediate state, and the control means inhibits a memory rewrite if the determining means determines that the image processing apparatus is in the intermediate state.

The determining means determines whether the image processing apparatus is in an abnormal state, and the control means inhibits a memory rewrite if the determining means determines that the image processing apparatus is in the abnormal state. The determining means determines whether the image processing apparatus is waiting, and the control means inhibits a memory rewrite if the determining means determines that the image processing apparatus is waiting.

The determining means determines whether the image processing apparatus is in operation or in any of an intermediate state, an abnormal state, and a wait state, and the control means performs a memory rewrite if the determining means determines that the image processing apparatus is neither in operation nor in any of these states. The device further comprises communication control means for controlling communication with an external apparatus, wherein the determining means determines the operating state of the image processing apparatus on the basis of an instruction transmitted from the external apparatus via the communication control means, thereby allowing the control means to perform the memory control. If the determining means determines that the memory is in a rewrite disable state, the control means performs the rewrite control for the memory after the rewrite disable state is canceled. The control means performs the rewrite control for the memory immediately when or a predetermined time after the rewrite disable state is canceled.

The device further comprises operating means for designating an operation of the image processing apparatus, wherein if the determining means determines that the memory is in a rewrite enable state, the control means displays a message, indicating that a rewrite is to be executed, on the operating means, and rewrites the memory after confirming that no rewrite disabling signal is input from the operating means. The device further comprises display means for displaying the operating state or the like data of the image processing apparatus, wherein the control means displays a message, indicating that a memory rewrite is being executed, on the display means while the memory rewrite is being executed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

One embodiment of the present invention will be described in detail below with reference to the accompanying drawings.

(First Embodiment)

Figure 1:
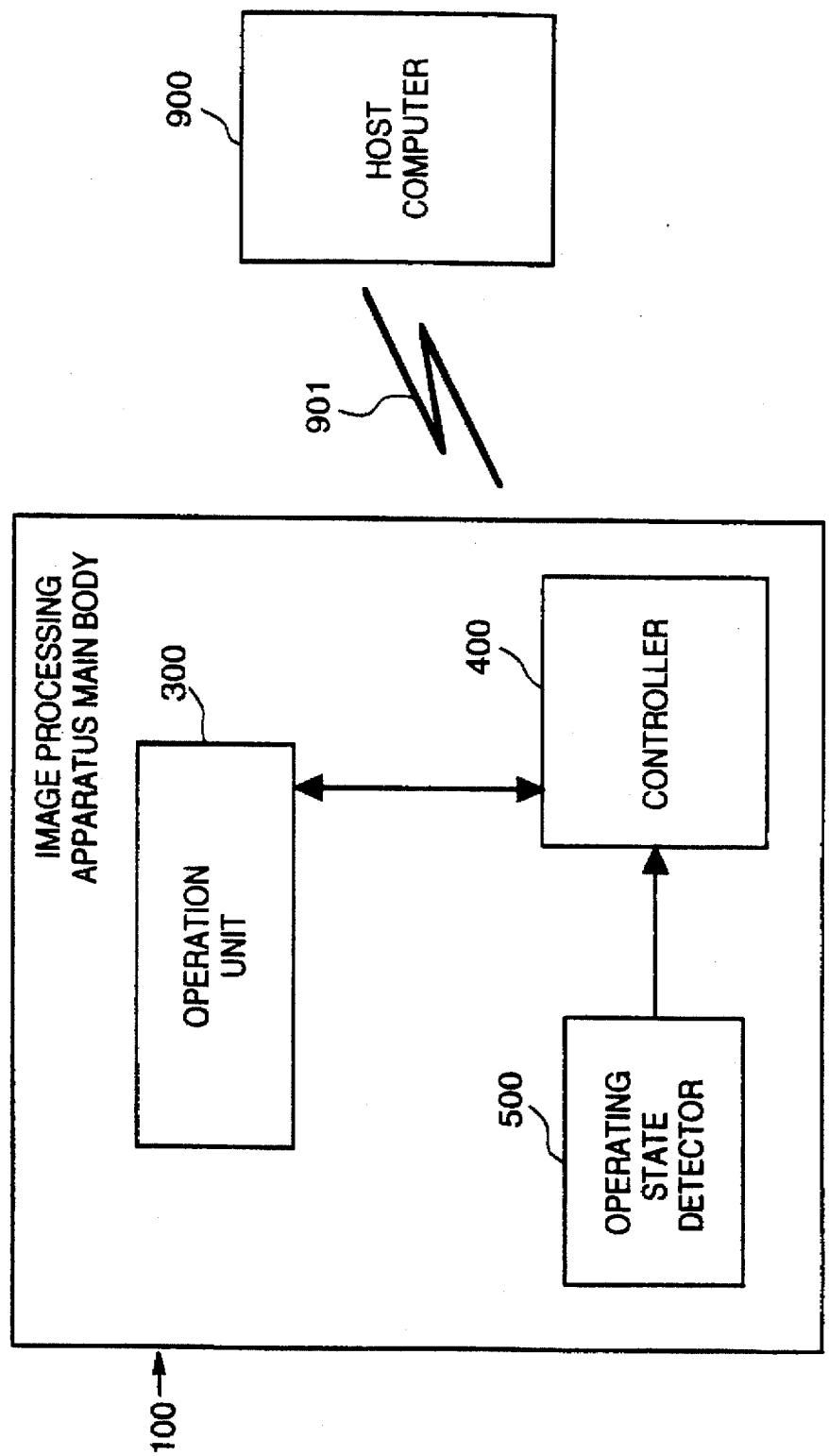
FIG. 1 is a block diagram for explaining the configuration of an image processing apparatus and a host computer according to one embodiment of the present invention.

FIG. 1 is a block diagram showing the configuration of the first embodiment of the present invention.

In FIG. 1, reference numeral 100 denotes an image processing apparatus main body; 300, an operation unit of the image processing apparatus; 400, a controller for controlling, e.g., rewrites to a memory and communications with external apparatuses; and 500, an operating state detector for detecting the operating state of the image processing apparatus 100.

Reference numeral 900 denotes a host computer which is an external apparatus and externally issues a memory rewrite instruction to the image processing apparatus 100; and 901, a communication line connecting the image processing apparatus 100 and the host computer 900. In this embodiment the communications through the communication line 901 are done using the RS-232C standard.

Figure 2:
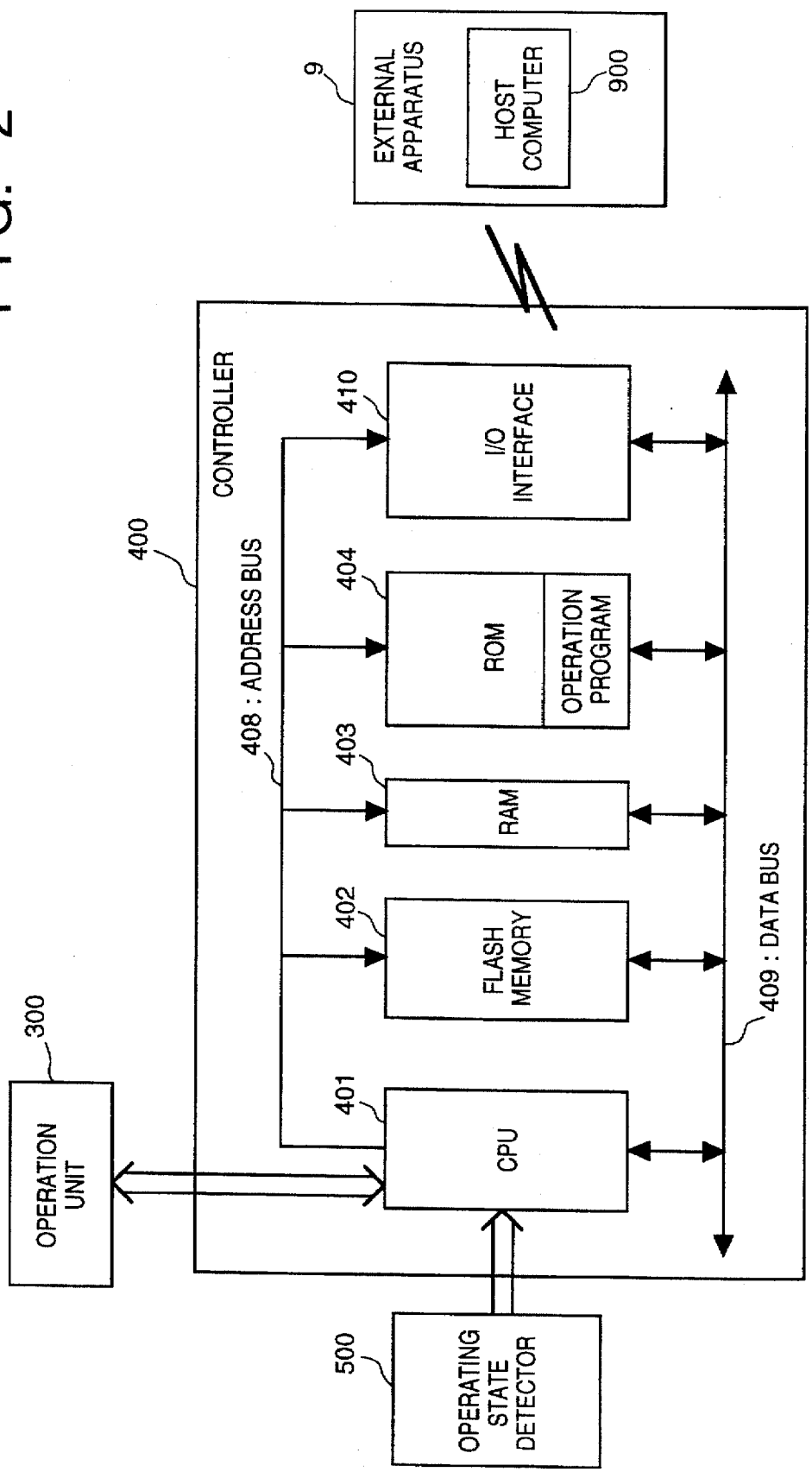
FIG. 2 is a block diagram for explaining details of the configuration of a controller shown in FIG. 1.

FIG. 2 is a block diagram showing details of the configuration of the controller 400 in FIG. 1.

Figure 14:
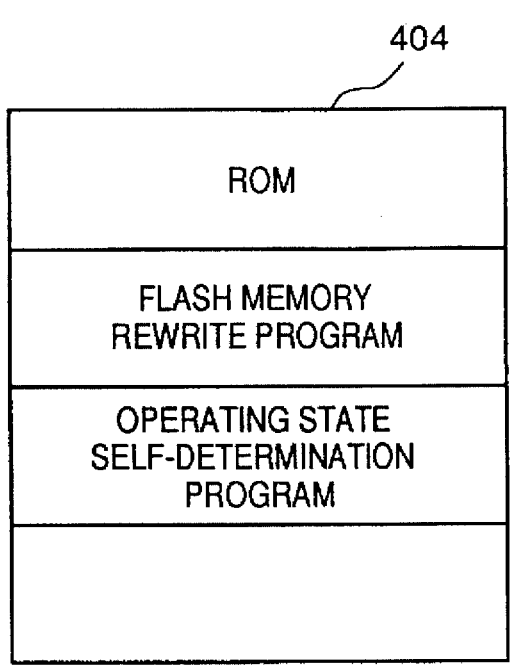
FIG. 14 is a view showing the programs stored in a ROM in the first embodiment.

In FIG. 2, reference numeral 401 denotes a CPU for controlling the image processing apparatus 100; and 402, an electrically erasable nonvolatile memory which can store the control programs of the image processing apparatus 100. In this embodiment the memory 402 is a flash memory. Reference numeral 403 denotes a RAM used as, e.g., a storage area for input data and a working storage area; and 404, a ROM which stores, as illustrated in FIG. 14, a program (to be described later) for rewriting the flash memory 402 and a program for self-determining the operating state of the image processing apparatus 100. Reference numeral 410 denotes an I/O interface for communications with an external apparatus 9; and 408 and 409, an address bus and a data bus, respectively, of the CPU 401.

Figure 3:
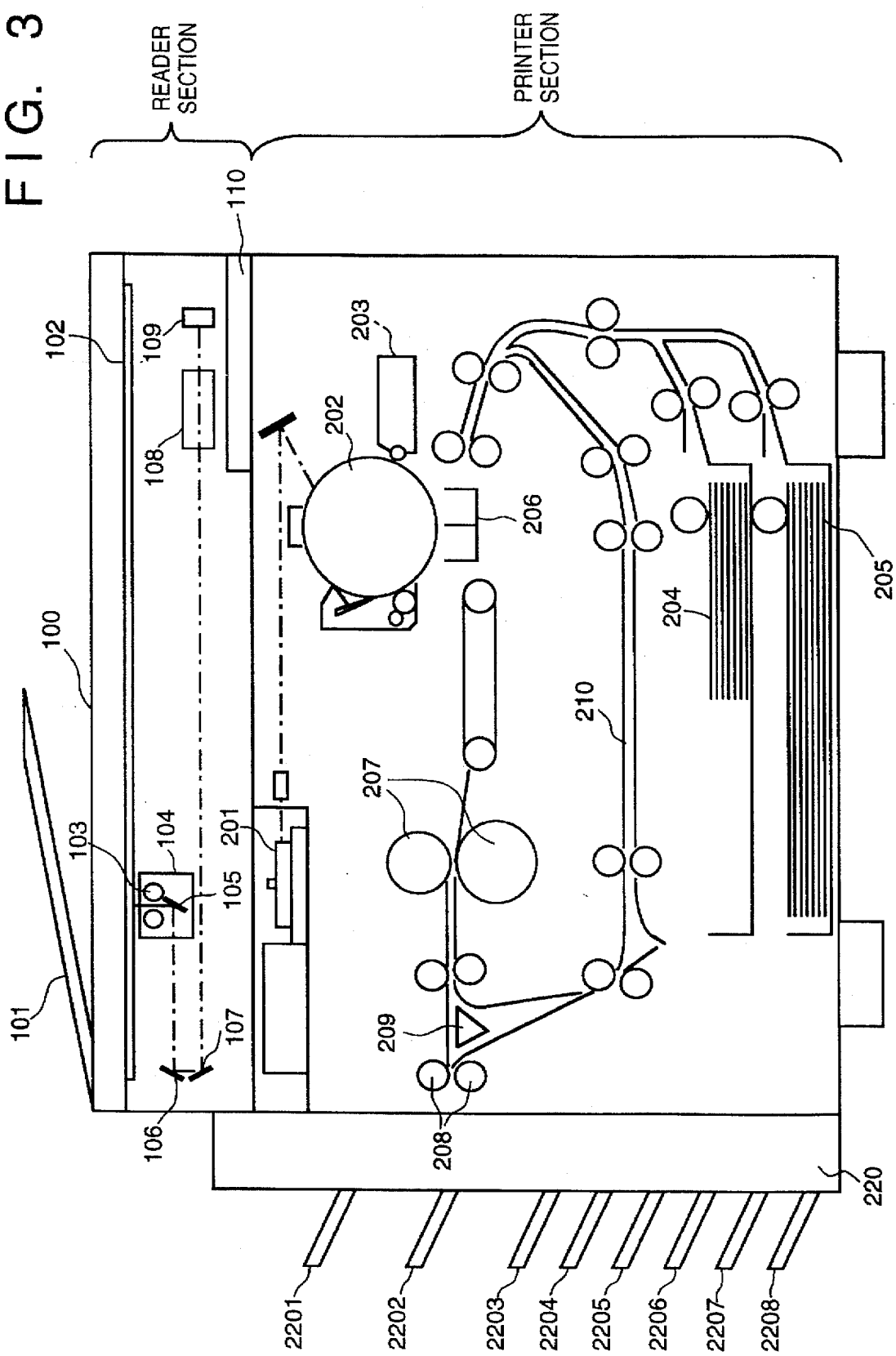
FIG. 3 is a sectional view showing the hardware arrangement of the image processing apparatus in FIG. 1.

FIG. 3 is a sectional view showing the arrangement of the image processing apparatus main body 100 in FIG. 1. The arrangement and operation of each of a reader section 1 and a printer section 2 will be described below.

In the reader section 1, sheets of a document placed on a document feeder 101 are sequentially fed one by one to an original glass plate 102. When each original is fed to a predetermined position on the original glass plate 102, a lamp 103 of a scanner is turned on, and a scanner unit 104 moves and illuminates the original. The reflected light from the original enters a CCD image sensor unit 109 (to be referred to as a CCD hereinafter) via mirrors 105, 106, and 107 and a lens 108. The reflected light from the original is photoelectrically converted in the CCD 109. The converted electrical signal is supplied to an image processor 110. The image processor 110 performs image processing set by various operation units. The image processor 110 also has an image memory and thereby rotates the image output direction. Furthermore, the image processor 110 has an external switching circuit for switching the signal from the reader section 1 to the printer section 2 or the external apparatus 9, and selecting one of the signals from the reader section 1 and the external apparatus 9 and connecting the selected signal to the printer section 2.

The electrical signal connected to the printer section 2 by the external switching circuit of the image processor 110 is converted into a modulated optical signal by an exposure controller 201 and illuminates a photosensitive body 202. A latent image formed on the photosensitive body 202 by the illuminating light is developed by a developing device 203. A transfer sheet is supplied from a transfer paper stacker 204 or 205 in synchronism with the leading end of the developed image, and the developed image is transferred in a transfer unit 206. The transferred image is fixed on the transfer sheet by a fixing unit 207 and the transfer sheet is delivered to the outside of the apparatus from a paper delivery unit 208.

The output transfer sheet from the paper delivery unit 208 is transferred to a sorter 220. The sorter 220 operates such that transfer sheets are delivered to trays in the order from a tray 2202 to a tray 2208 when a sort function is activated, and that transfer sheets are delivered to an uppermost tray 2201 when the sort function is not activated.

A method of outputting sequentially read images onto both sides of one output sheet will be described. After the output sheet fixed by the fixing unit 207 is conveyed to the paper delivery unit 208, the conveyance direction of the sheet is reversed, and the sheet is conveyed to a refeed transfer paper stacker 210 via a conveyance direction switching member 209. When the next original is ready, the original image is read in the same fashion as the above process. However, the transfer sheet is fed from the refeed transfer paper stacker 210. Eventually, two original images can be output onto the upper and lower surfaces of one output sheet.

Figure 4:
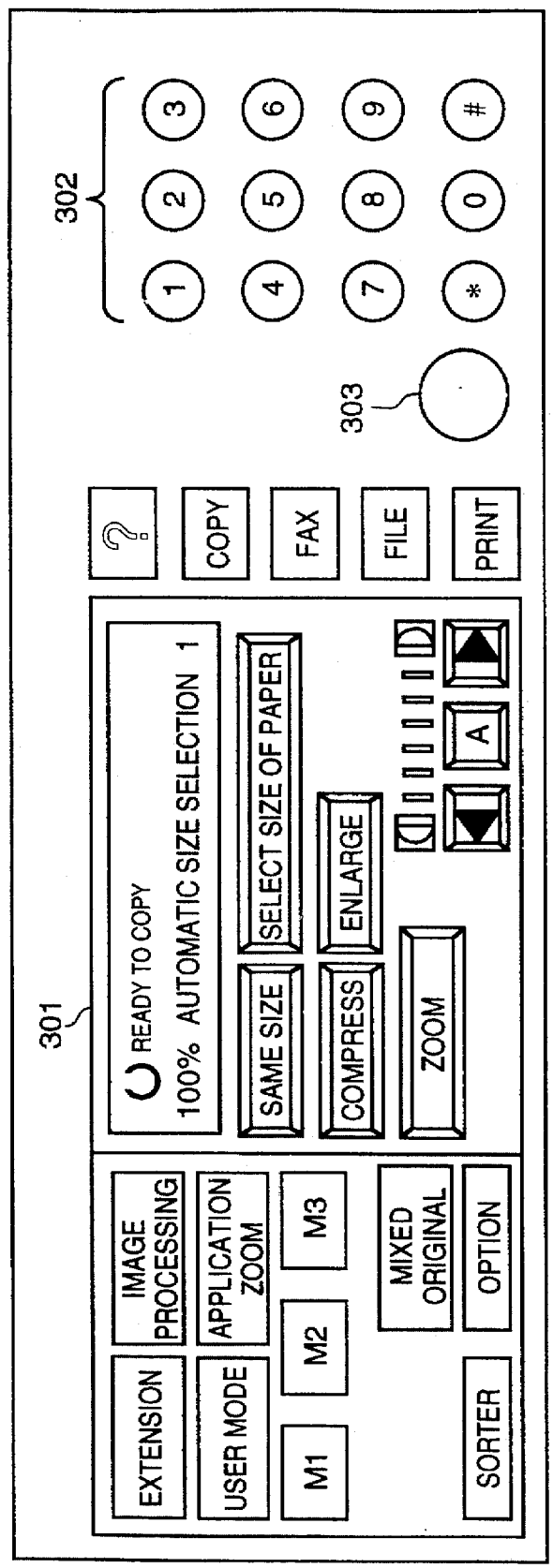
FIG. 4 is a plan view for explaining the layout of an operation unit shown in FIG. 1.

FIG. 4 shows the layout of the operation unit 300. In FIG. 4, reference numeral 301 denotes a display which displays the operating state of the apparatus and messages. The surface of the display 301 is a touch panel which functions as a select key when touched by the operator. Reference numeral 302 denotes ten keys for inputting numerals; and 303, a start key which starts the operation when depressed.

Assume that the image processing apparatus 100 of this embodiment having the above arrangement has at least two operation modes: a normal mode for performing a normal copying operation and a rewrite mode for rewriting the flash memory 402. Assume also that when the apparatus is operating in the rewrite mode, no other operation is accepted until the rewrite is completed.

In the image processing apparatus 100 of this embodiment having the above arrangement, upon receiving a rewrite mode proceeding instruction from the host computer 900 via the I/O interface 410, the controller 400 activates the program, FIG. 14, which is stored in the ROM 404 and determines the operating state of the image processing apparatus. On the basis of the activated program, the controller 400 executes a predetermined operation to thereby determine the operating state of the image processing apparatus 100.

If the determination result indicates that the image processing apparatus is in operation or in an intermediate state, an abnormal state, or a wait state, the controller 400 transmits a rewrite inhibit signal to the host computer 900. If the image processing apparatus is in a state other than these states, the controller 400 transmits a rewrite enable signal to the host computer 900. Even if the image processing apparatus is in the rewrite inhibit state, the controller 400 transmits the rewrite enable signal to the host computer 900 at the same time the state is canceled.

Also, in order that a rewrite action to the image processing apparatus 100 can be performed from a remote place, it is possible to add a function of obtaining permission from the user by displaying a message on the operation unit prior to transmitting the rewrite enable signal to the host computer 900.

When the image processing apparatus 100 is in the rewrite enable state after the above operation, the apparatus proceeds from the normal mode to the rewrite mode. Thereafter, the image processing apparatus 100 receives a rewrite instruction for the flash memory 402 from the host computer 900 to start the rewrite.

Note that the memory rewrite for a program or data from the host computer 900 is done in particular cases as follows.

(1) When a program or a parameter needs to be changed because an option device, such as a document feeder or a sorter, is added to or altered in the image processing apparatus.

When such an option is added or altered, it is sometimes necessary to change the sequence program of the image processing apparatus main body or the display or operation program of the operation unit. In this case, a memory rewrite is performed accordingly.

(2) When a program or a parameter needs to be changed because the function of the image processing apparatus itself is changed or added.

As an example, an image processing apparatus having only a copying function is in some instances made to function as a printer for a personal computer or provided with a communication function such as the function of a facsimile. In this case, as in the case described above, it is sometimes necessary to change, e.g., various programs including the sequence program, and a memory rewrite is done accordingly.

(3) When a program or a parameter needs to be changed because the speed of the image processing apparatus is increased or the display contents of the operation display unit are altered.

Even when the physical configuration of the image processing apparatus itself remains unchanged or no option is added to the apparatus, the sequence program or the display program, for example, is sometimes improved in order to increase the speed of the image processing apparatus or to improve the operability of the apparatus. If this is the case, a memory rewrite is performed accordingly.

The representative examples of a memory rewrite for a program or a parameter have been described above. In addition to these examples, however, a program or a parameter of the image processing apparatus needs to be changed in various cases. In such cases, as in the above cases, a memory rewrite for altering the program or the parameter or adding a new one is performed following the procedure explained below.

Note that if it is only necessary to simply change a parameter such as numerical data, rather than to entirely or partially change the program, it is of course possible to perform a memory rewrite by using data corresponding to that parameter.

Details of the memory rewrite operation of this embodiment will be described below with reference to the flow chart in FIG. 5.

Figure 5:
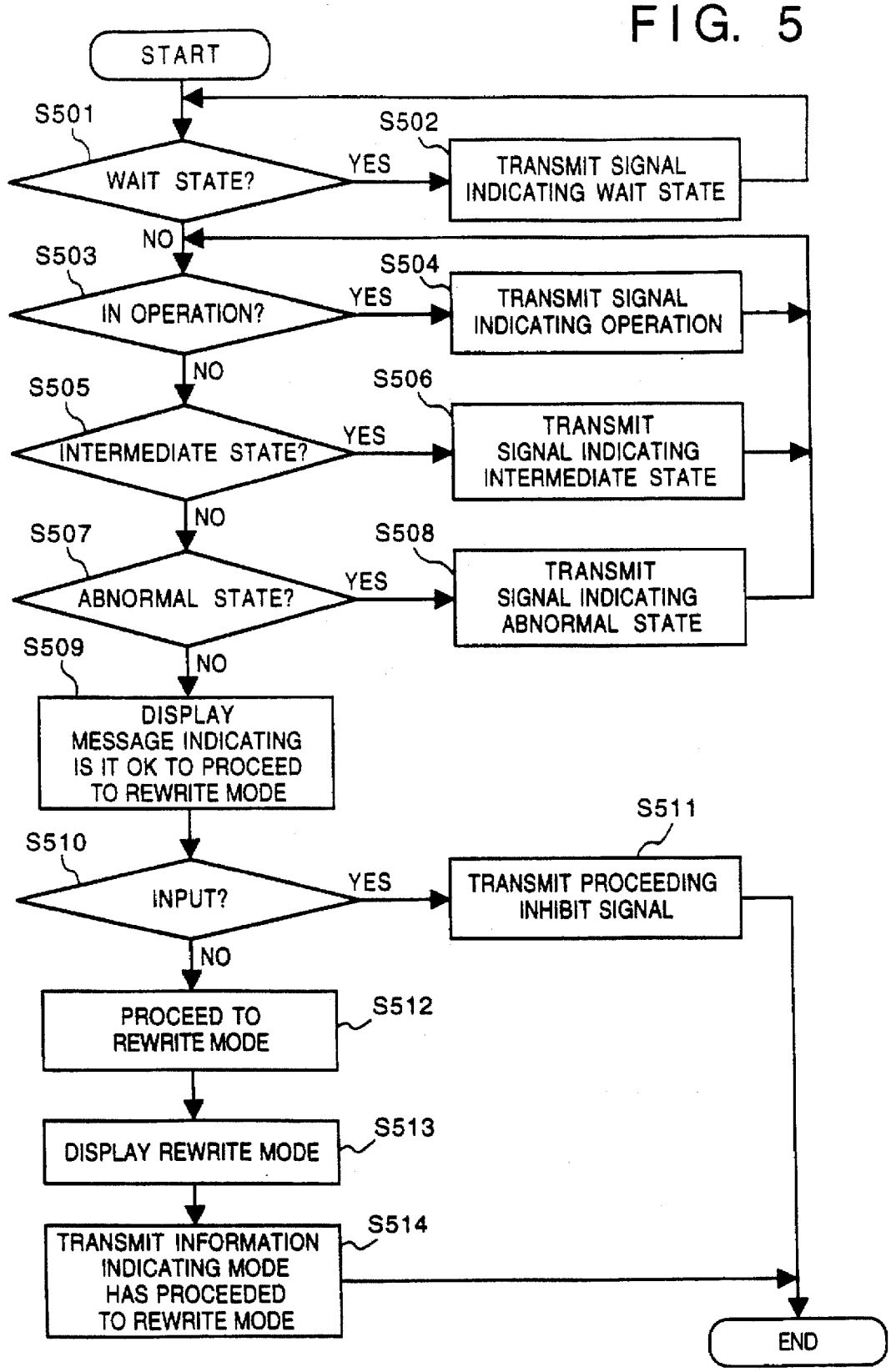
FIG. 5 is a flow chart showing the program procedure for self-determining the operating state of the image processing apparatus according to the embodiment.

The program shown in FIG. 5 is to self-determine the operating state of the image processing apparatus. This program is previously stored in a predetermined storage area of the ROM 404 and activated when the rewrite mode proceeding instruction is received from the host computer 900. The CPU 401 executes the program in FIG. 5.

Upon receiving the rewrite mode proceeding instruction from the host computer 900, the CPU 401 proceeds on to the processing in step S501 in FIG. 5 to check whether the image processing apparatus 100 is just switched on or the apparatus is in a wait state for recovery. If the apparatus is in the wait state, the flow advances to step S502, and the CPU 401 transmits a signal indicating the wait state to the host computer 900 via the I/O interface 410. The flow returns to step S501.

On the other hand, if the image processing apparatus 100 is not in the wait state in step S501, the flow advances to step S503, and the CPU 401 checks whether the image processing apparatus 100 is performing any of, e.g., a copying operation, a FAX operation, and a print-out operation. If the image processing apparatus is in operation, the flow advances to step S504, and the CPU 401 transmits a signal indicating the operation to the host computer 900. The flow returns to step S503.

If the image processing apparatus 100 is not in operation in step S503, the flow advances to step S505, and the CPU 401 checks whether the image processing apparatus 100 is in an intermediate state including "paper jamming", "no paper", and "no toner" If the image processing apparatus is in the intermediate state, the flow advances to step S506, and the CPU 401 transmits a signal indicating the intermediate state to the host computer 900. The flow returns to step S503.

If the image processing apparatus 100 is not in the intermediate state in step S505, the flow advances to step S507, and the CPU 401 checks whether the image processing apparatus 100 is in an abnormal state which includes abnormal heating of a heat roller. If the image processing apparatus is in an abnormal state, the flow advances to step S508, and the CPU 401 transmits a signal indicating the abnormal state to the host computer 900. The flow returns to step S503.

If the image processing apparatus 100 is not in the abnormal state in S507, i.e., if the CPU 401 determines that the apparatus is in or has reached a rewrite enable state, the flow advances to step S509. In step S509 the CPU 401 displays a message, which indicates that the operation is going to proceed to the rewrite mode, on the display 301 of the operation unit 300. Thereafter, in step S510 the CPU 401 checks whether there is an input from the operation unit 300. This is to allow the user of the image processing apparatus to stop the proceeding to the rewrite mode by inputting a command after checking the display in step S509, if he or she wishes to stop the proceeding by determining whether it is safe to proceed to the rewrite mode. If a command for stopping the proceeding to the rewrite mode is input in step S510, the flow advances to step S511, and the CPU 401 transmits a signal for inhibiting the proceeding to the rewrite instruction to the host computer 900. The CPU 401 ends the processing by maintaining the normal mode as the operation mode.

If the proceeding to the rewrite mode is not stopped in step S510 (including the case in which a command is not input because the user is not nearby the image processing apparatus 100), the flow advances to step S512, and the operation mode proceeds from the normal mode to the rewrite mode. In step S513, the CPU 401 displays a message, indicating that the rewrite mode is set, on the display 301. In step S514, the CPU 401 transmits to the host computer 900 a signal indicating that the mode has proceeded on to the rewrite mode, and the image processing apparatus 100 waits until a rewrite instruction is received from the host computer 900.

After the above operation, the image processing apparatus 100 receives a rewrite instruction from the host computer 900 and starts a rewrite action by the rewrite program stored in the ROM 404. More specifically, the CPU 401 receives, from the host computer 900, memory address information and rewrite data for the flash memory 402 to be rewritten, and rewrites the received rewrite data into the received memory address position of the flash memory 402.

In this embodiment as described above, the image processing apparatus 100 self-determines its operating state prior to rewriting the flash memory 402. Consequently, it is possible to prevent run away of the image processing apparatus occurring when a rewrite action is executed while the apparatus is in operation. It is also possible to perform a rewrite action at the same time the rewrite enable state is set.

(Second Embodiment)

The second embodiment of the present invention will be described below. The basic configuration of the second embodiment is identical with that of the first embodiment shown in FIG. 1. Also, the arrangement of an image processing apparatus 100 and the layout of an operation unit 300 of the second embodiment are the same as those of the first embodiment illustrated in FIGS. 3 and 4. Therefore, description of the parts of the arrangement which are the same as in the first embodiment will be omitted.

Figure 6:
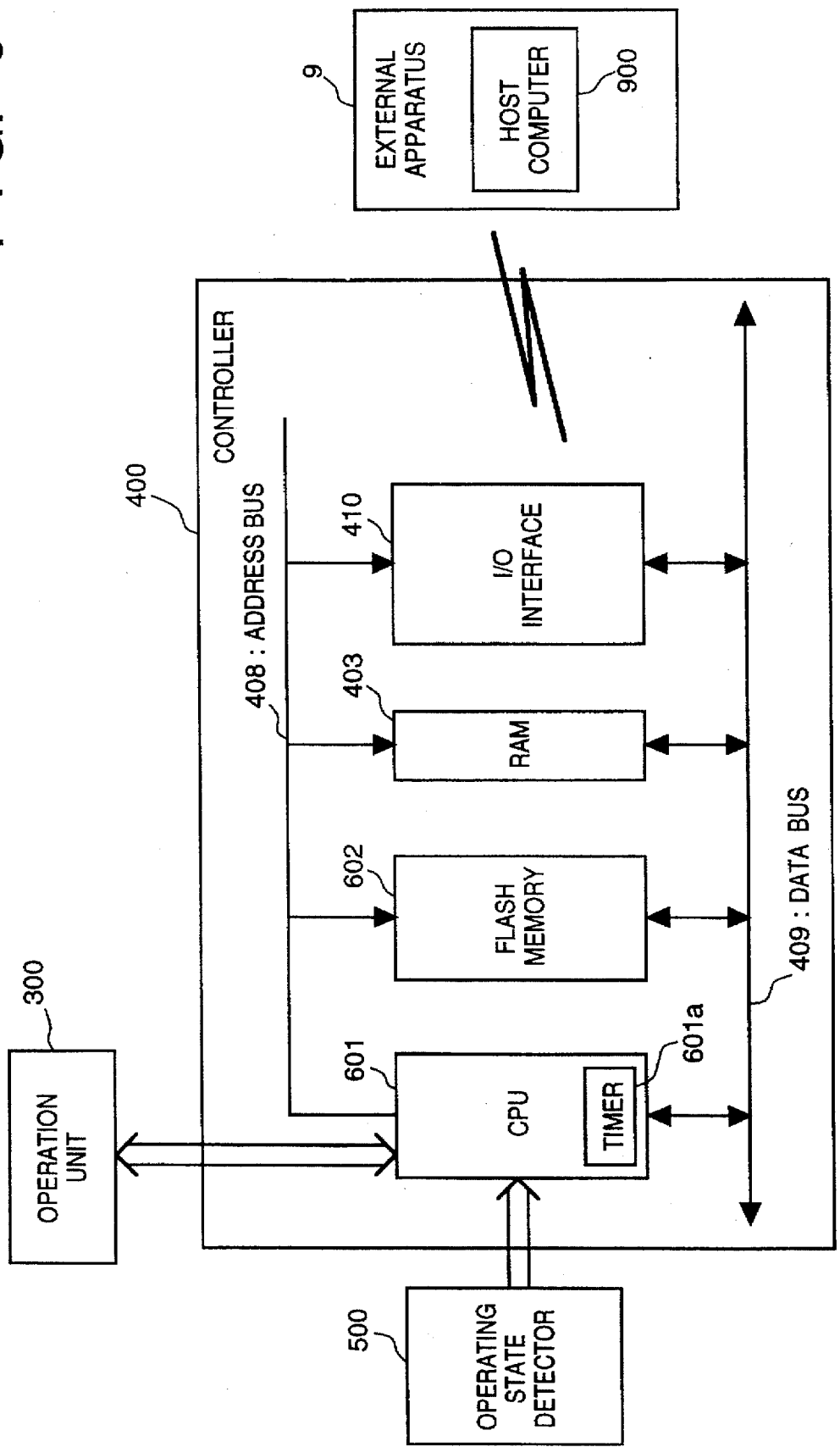
FIG. 6 is a block diagram for explaining details of the configuration of a controller according to the second and third embodiments of the present invention.
Figure 15:
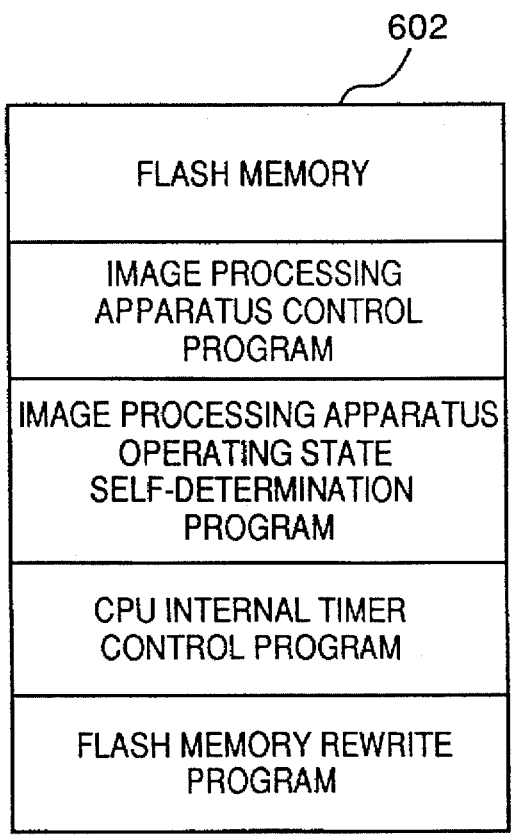
FIG. 15 is a view showing the programs stored in a flash memory in the second embodiment.

FIG. 6 shows details of the configuration of a controller 400 in the second embodiment. The configuration of the controller 400 of the second embodiment is basically identical with that of the first embodiment illustrated in FIG. 2 except for the following point. That is, in the controller 400 of the second embodiment shown in FIG. 6, reference numeral 601 denotes a CPU which incorporates a timer 601a and controls the image processing apparatus 100; and 602, a flash memory which is an electrically erasable nonvolatile memory. As shown in FIG. 15, the flash memory 602 stores a control program of the image processing apparatus 100, a program for self-determining the operating state of the image processing apparatus 100, a control program of the internal timer 601a of the CPU 601, and a program for rewriting the flash memory 602. The rest of the configuration is the same as that of the first embodiment.

The internal timer 601a of the CPU 601 takes the value which is determined by a preset rewrite mode proceeding time. The rewrite mode proceeding time is the time from setting a rewrite enable state to actually proceeding to a rewrite mode. By setting this rewrite mode proceeding time it is possible to inhibit a rewrite action if the work is temporarily interrupted.

In the image processing apparatus 100 of the second embodiment having the above arrangement, the controller 400 executes a predetermined operation on the basis of the program which is stored in the flash memory 602 and determines the operating state of the image processing apparatus 100. In this manner the controller 400 constantly determines the operating state of the image processing apparatus 100. If the determination result obtained by the program indicates the rewrite enable state, the CPU 601 starts the internal timer 601a. When the set time elapses, the CPU 601 stores, as the status, information indicating that it is possible to proceed to the rewrite mode, in a RAM 403. However, if another operation is started and a rewrite inhibit state is set accordingly, the CPU 601 clears this status.

Upon receiving a rewrite mode proceeding instruction from a host computer 900 via an I/O interface 410, the CPU 601 reads out the status stored in the RAM 403 and transmits the read-out state to the host computer 900.

After the above operation, the image processing apparatus 100 proceeds from the normal mode to the rewrite mode, receives the rewrite instruction for the flash memory 602 from the host computer 900, and starts the rewrite.

Figure 7:
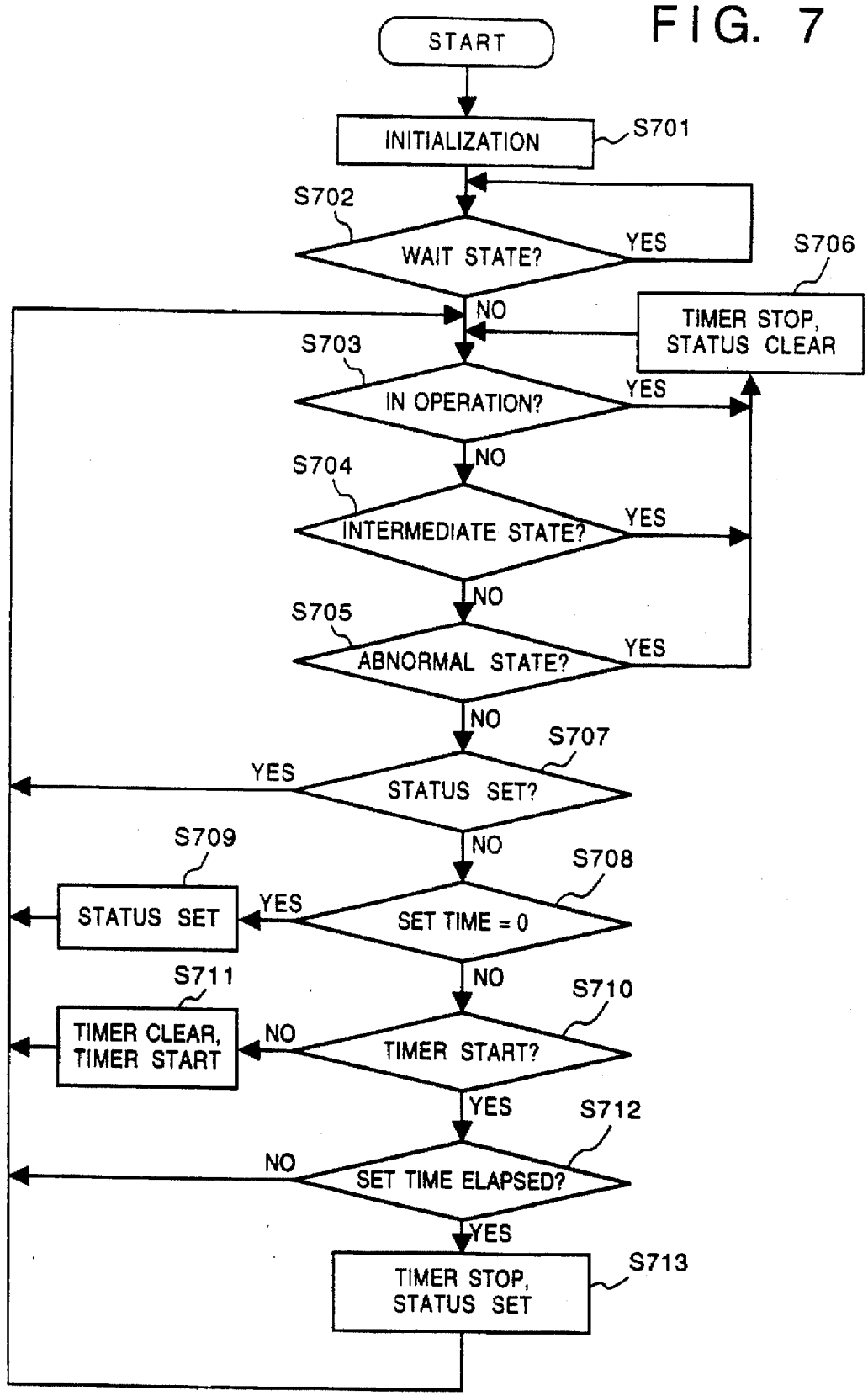
FIG. 7 is a flow chart showing the control pertaining to an internal timer of a CPU in the second embodiment.
Figure 8:
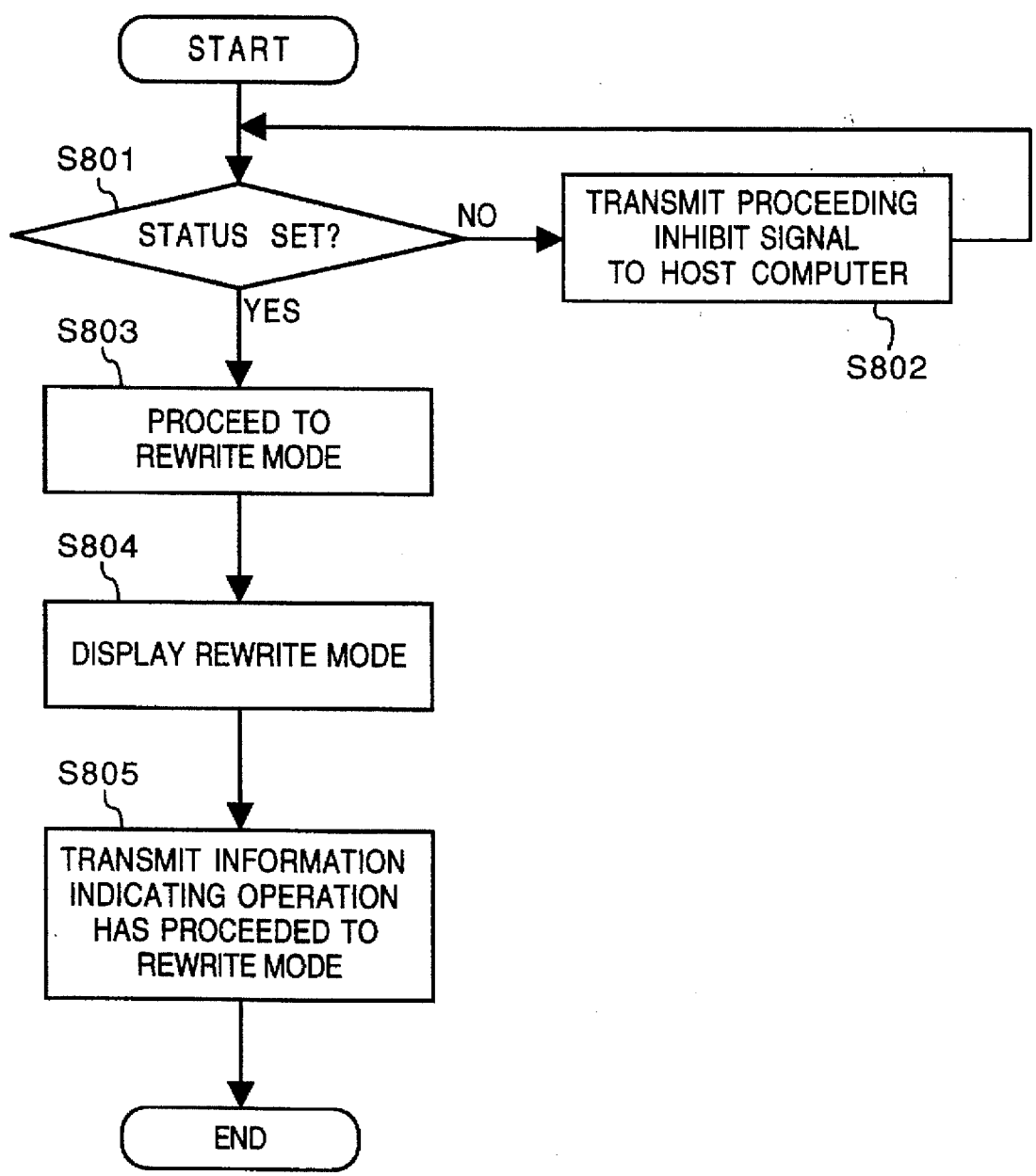
FIG. 8 is a flow chart showing the control performed when the CPU has received a rewrite mode proceeding instruction from a host computer in the second embodiment.

Details of the above operation of the second embodiment will be described below with reference to the flow charts in FIGS. 7 and 8. FIG. 7 is a flow chart showing the control pertaining to the internal timer 601a. FIG. 8 is a flow chart showing the control when a rewrite mode proceeding instruction is received from the host computer 900.

First, the control relating to the internal timer 601a of the CPU 601 of the second embodiment will be described below with reference to FIG. 7.

The control program shown in FIG. 7 is activated upon turning on of the power switch or start-up for recovery. Initialization is done in step S701. In this initialization, a rewrite enable status, which indicates that it is possible to proceed to the rewrite mode, and the timer 601a are cleared. Note that the rewrite mode proceeding time (to be described in detail later) is predetermined and set independently. However, this proceeding time can also be changed by a command and can, of course, be set by the host computer 900.

In step S702, the CPU 601 checks whether the image processing apparatus is in a wait state at start-up. If the image processing apparatus 100 is in the wait state, the CPU 601 executes the processing in step S702 and waits until the wait state at start-up is completed.

On the other hand, if the image processing apparatus 100 is not in the wait state in step S702, the flow advances to step S703, and the CPU 601 checks whether the image processing apparatus 100 is performing any of, e.g., a copying operation, a FAX operation, and a print-out operation. If the image processing apparatus is in operation, the flow advances to step S706, and the CPU 601 stops the internal timer 601a and clears the status. The flow returns to step S703.

If the image processing apparatus 100 is not in operation in step S703, the flow advances to step S704, and the CPU 601 checks whether the image processing apparatus 100 is in an intermediate state including "paper jamming", "no paper", and "no toner". If the image processing apparatus is in an intermediate state, the flow advances to step S706.

If the image processing apparatus 100 is not in an intermediate state in step S704, the flow advances to step S705, and the CPU 601 checks whether the image processing apparatus 100 is in an abnormal state which includes abnormal heating of a heat roller. If the image processing apparatus is in an abnormal state, the flow advances to step S706.

If the image processing apparatus 100 is not in an abnormal state in S705, i.e., if the CPU 601 determines that the apparatus is in or has reached a rewrite enable state, the flow advances to step S707. In step S707 the CPU 601 checks the rewrite enable status. If the rewrite enable status is set, the flow returns to step S703.

If the rewrite enable status is not set, the flow advances from step S707 to step S708, and the CPU 601 checks the setting of the rewrite mode proceeding time. If the set time is 0, the flow advances to step S709, and the CPU 601 sets the rewrite enable status. The flow returns to step S703.

If the rewrite mode proceeding time is not 0 in step S708, the flow advances to step S710, and the CPU 601 checks the state of the timer 601a (checks whether the timer 601a has already started). If the timer 601a has not started, the flow advances to step S711, and the CPU 601 clears and starts the timer 601a. The flow returns to step S703.

If the timer 601a has already started in step S710, the flow advances to step S712, and the CPU 601 checks whether the set time of the timer 601a is reached. If the set time of the timer 601a is not reached, the flow returns to step S703. If the set time of the timer 601a is reached, the CPU 601 stops the timer 601a and sets the rewrite enable status. The flow returns to step S703, and the CPU 601 again checks the state of the image processing apparatus.

The control performed when a rewrite mode proceeding instruction is received from the host computer 900 will be described below with reference to FIG. 8. The program shown in FIG. 8 is stored in the flash memory 602 and started when a rewrite mode proceeding instruction is received from the host computer 900.

In step S801, the CPU 601 checks the rewrite enable status indicated by the timer control in FIG. 7. If the rewrite enable status is not set, the flow advances to step S802, and the CPU 601 transmits a rewrite inhibit instruction to the host computer 900. The flow returns to step S801, and the CPU 601 monitors until a rewrite enable state is set.

If the rewrite enable status is set in step S801, the flow advances to step S803 to proceed on to the rewrite mode. In step S804, the CPU 601 displays a message, which indicates that the operation has proceeded to the rewrite mode, on a display 301 of the operation unit 300. In step S805, the CPU 601 transmits information indicating that the operation has proceeded to the rewrite mode to the host computer 900. Consequently, the image processing apparatus 100 waits until a rewrite instruction is received from the host computer 900.

Figure 9:
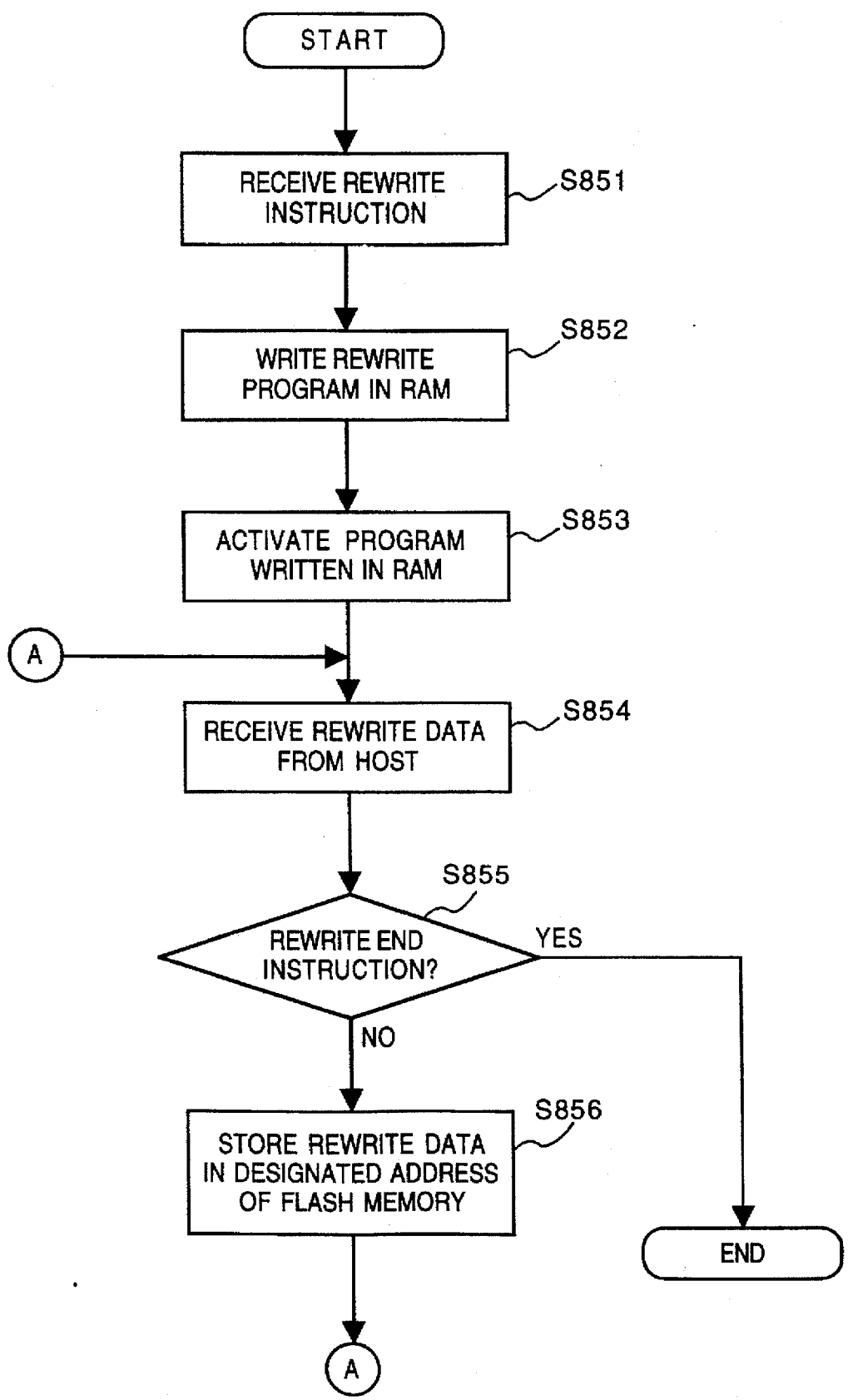
FIG. 9 is a flow chart showing the program rewrite control for the flash memory in the second embodiment.

Rewrite control for the program stored in the flash memory 602, which succeeds the operation described above, will be described below with reference to the flow chart in FIG. 9. FIG. 9 is a flow chart showing the rewrite control for the stored program in the flash memory 602 in the second embodiment.

In step S851, the CPU 601 receives the rewrite instruction from the host computer 900. In step S852, the CPU 601 transfers the flash memory rewrite program stored in the flash memory 402 to the RAM 403 and writes the program in the RAM 403. In step S853, the CPU 601 activates the flash memory rewrite program written in the RAM 403. Thereafter, the CPU 601 executes the program in the RAM 403.

In step S854, the CPU 601 receives, from the host computer 900, rewrite data and rewrite address instruction for the flash memory 602. When the rewrite is completed, the host computer 900 sends a rewrite end instruction. In step S855, the CPU 601 checks whether this rewrite end instruction is received. Since initially this instruction is not received, the flow advances to step S856, and the CPU 601 performs a rewrite action by rewriting the received rewrite data in the designated rewrite address position, in the same fashion as in the first embodiment described previously. The flow returns to step S854, and the CPU 601 receives the next rewrite data.

When the rewrite data are sequentially rewritten as above and the whole rewrite operation is completed, the host computer 900 sends a rewrite end instruction. Upon receiving this instruction, the CPU 601 exits from the loop in step S855 and ends the processing. The CPU 601 then returns to the main program (normal mode) stored in the flash memory 602.

Although the host computer 900 sends the rewrite address in the above operation, the embodiment is not limited to this operation. That is, it is possible to perform control such that data are sequentially rewritten in predetermined address positions and the processing is terminated when the rewrite is done up to a predetermined address. This similarly applies to the first embodiment described earlier.

In the second embodiment as described above, the operating state of the image processing apparatus 100 is self-determined prior to rewriting the flash memory 602, and the timer 601a for proceeding on to the rewrite mode also is provided. As a consequence, it is possible to prevent run away of the image processing apparatus taking place when a rewrite is performed while the apparatus is in operation. It is also possible to perform a rewrite action after an elapse of a predetermined time while the image processing apparatus is not in use.

(Third Embodiment)

The third embodiment of the present invention will be described below. The basic arrangement of the third embodiment is substantially identical with those of the first and second embodiments described above, except that the configuration of a controller 400 is slightly different from that of the second embodiment illustrated in FIG. 6. Therefore, description of the parts which are the same as in the first and second embodiments will be omitted.

In the controller 400 of the third embodiment shown in FIG. 6, reference numeral 601 denotes a CPU for controlling an image processing apparatus 100; 602, an electrically erasable nonvolatile memory which is a flash memory in this third embodiment; 403, a RAM used as an input data storage area or a working storage area; 410, an I/O interface for communications with an external apparatus 9; and 408 and 409, an address bus and a data bus, respectively, of the CPU 601. The flash memory 602 stores a control program of the image processing apparatus 100 and a program for rewriting the flash memory 602. That is, in comparison with the second embodiment shown in FIG. 15, the flash memory 602 does not necessarily store a program for self-determining the operating state of the image processing apparatus 100 and a control program for a timer of the CPU 601.

In the image processing apparatus 100 with the above arrangement and a host computer 900, the host computer 900 first sends an operating state transmission instruction to the image processing apparatus 100. The image processing apparatus 100 receives this instruction and transmits its operating state from the controller 400 to the host computer 900. Upon receiving the operating state from the image processing apparatus 100, the host computer 900 performs control on the basis of the received operating state.

That is, the host computer 900 inhibits a rewrite action if the image processing apparatus is in operation (including a copying operation, a FAX operation, and a print-out operation), or in an intermediate state including "paper jamming", "no paper", and "no toner", or an abnormal state such as abnormal heating of a heat roller, or a wait state at start-up. If the image processing apparatus 100 is in a state other than these states, the host computer 900 transmits a flash memory rewrite execute signal to the image processing apparatus 100.

The image processing apparatus 100 receives the rewrite execute signal and starts a rewrite action in accordance with the flash memory rewrite program stored in the flash memory 602.

Figure 10:
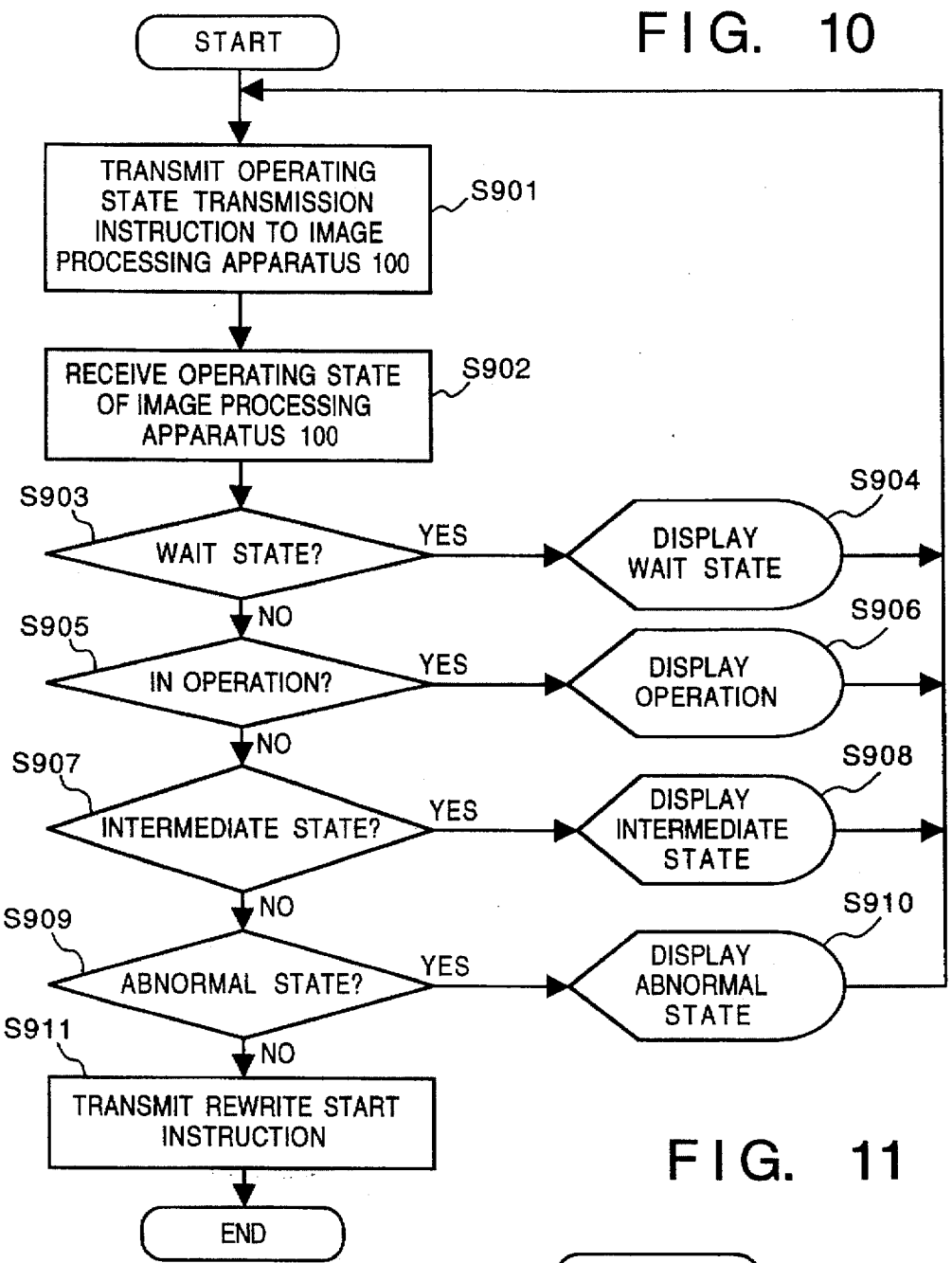
FIG. 10 is a flow chart showing the control done by a host computer to determine the operating state of the image processing apparatus according to the third embodiment of the present invention.
Figure 11:
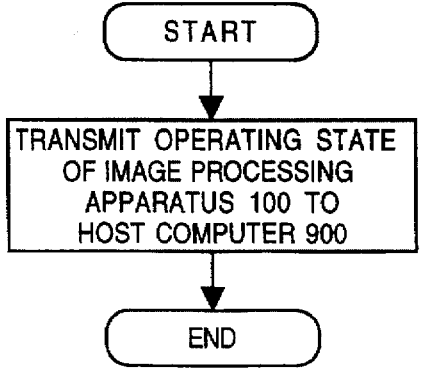
FIG. 11 is a flow chart showing the control done by the image processing apparatus of the third embodiment to determine the operating state of the apparatus.

The operation of the third embodiment will be described below with reference to the flow charts in FIGS. 10 and 11. FIGS. 10 and 11 are flow charts showing the procedures for determining the operating state of the image processing apparatus 100 in the third embodiment, performed by the host computer 900 and the image processing apparatus 100, respectively.

In step S901, the host computer 900 transmits an operating state transmission instruction to the image processing apparatus 100. Upon receiving this instruction, the image processing apparatus 100 executes the operation shown in FIG. 11 and transmits the operating state to the host computer 900. In step S902, therefore, the host computer 900 receives the operating state which is sent from the image processing apparatus 100 in accordance with the operation in FIG. 11. In the processing from step S903, the host computer 900 checks the operating state sent from the image processing apparatus 100.

In step S903, the host computer 900 checks whether the image processing apparatus 100 is just switched on or the apparatus is in a wait state for recovery. If the image processing apparatus 100 is in the wait state, the flow advances to step S904 to display the wait state. The flow then returns to step S901.

On the other hand, if the image processing apparatus 100 is not in the wait state in step S903, the flow advances to step S905, and the host computer 900 checks whether the image processing apparatus 100 is performing any of, e.g., a copying operation, a FAX operation, and a print-out operation. If the image processing apparatus 100 is in operation, the flow advances to step S906 to display the operation. The flow then returns to step S901.

If the image processing apparatus 100 is not in operation in step S905, the flow advances to step S907, and the host computer 900 checks whether the image processing apparatus 100 is in an intermediate state including "paper jamming", "no paper", and "no toner". If the image processing apparatus 100 is in an intermediate state, the flow advances to step S908 to display the intermediate state. The flow then returns to step S901.

If the image processing apparatus 100 is not in an intermediate state in step S907, the flow advances to step S909, and the host computer 900 checks whether the image processing apparatus 100 is in an abnormal state which includes abnormal heating of a heat roller. If the image processing apparatus is in an abnormal state, the flow advances to step S910, and the host computer 900 displays a message indicating that the image processing apparatus is in the abnormal state. The flow then returns to step S901.

If the image processing apparatus 100 is not in an abnormal state in S909, i.e., if the host computer 900 determines that the flash memory of the image processing apparatus 100 is writable, the flow advances to step S911. In step S911 the host computer 900 transmits a rewrite start instruction to the image processing apparatus 100. Subsequently, the host computer 900 transmits data to be rewritten into the flash memory 602, together with a rewrite address, to the image processing apparatus 100. Note that as mentioned earlier, control can also be effected by transmitting no address data.

Upon receiving the rewrite instruction from the host computer 900, the image processing apparatus 100 starts a rewrite action by using the rewrite program stored in the flash memory 602. In accordance with the rewrite data transmitted subsequently, the image processing apparatus 100 rewrites the contents of the flash memory 602.

In the third embodiment as described above, the host computer 900 checks the operating state of the image processing apparatus 100 prior to rewriting the flash memory 602. As a consequence, it is possible to prevent run away of the image processing apparatus taking place when a rewrite is performed while the apparatus is in operation. It is also possible to perform a rewrite action at the same time the rewrite enable state is set.

(Fourth Embodiment)

The fourth embodiment of the present invention will be described below. Note that description of the same parts as in the first, second, and third embodiments will be omitted.

Figure 12:
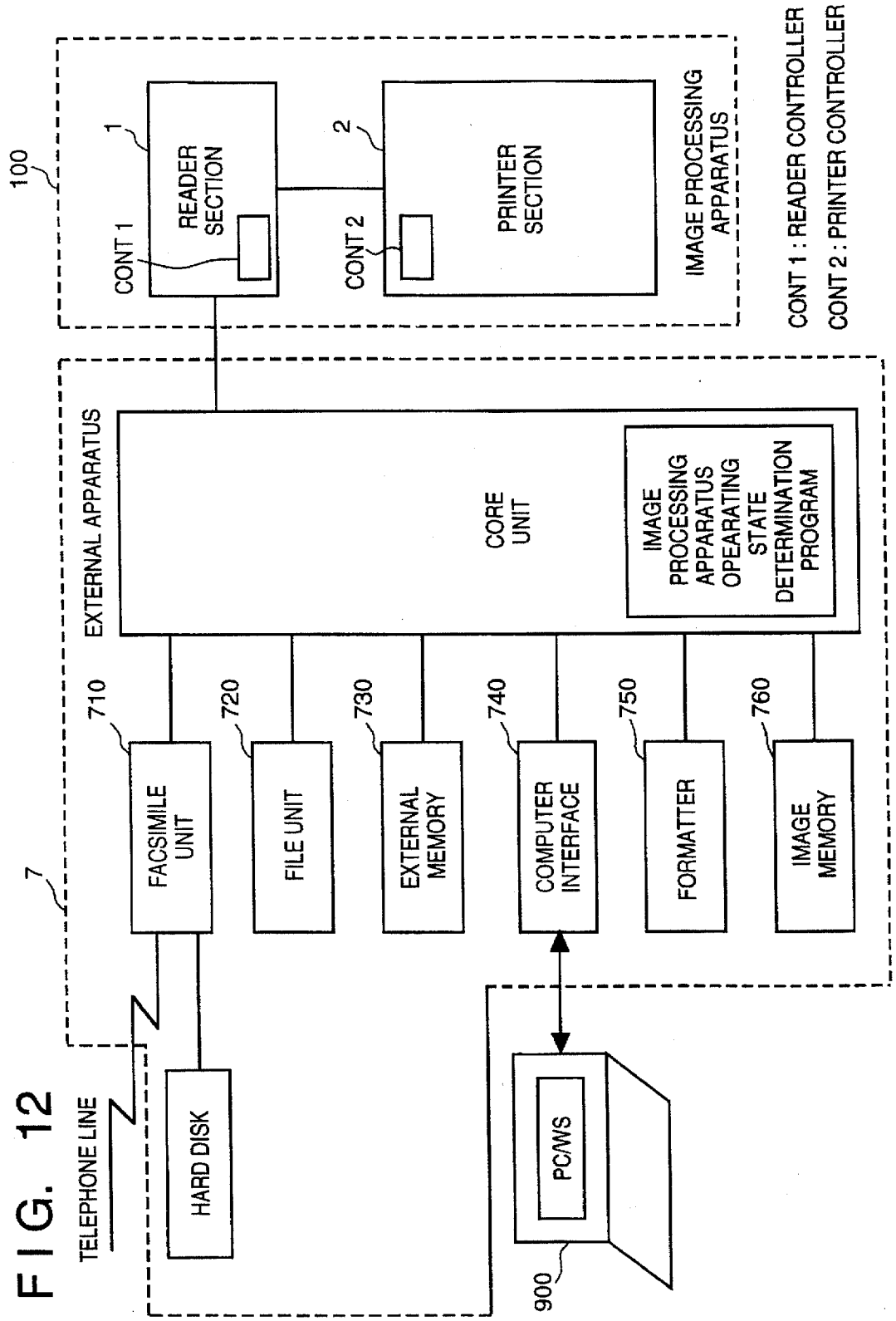
FIG. 12 is a block diagram showing the configuration of an image processing apparatus and its peripheral devices according to the fourth embodiment of the present invention.

FIG. 12 is a block diagram showing the configuration of an image processing apparatus 100 and its peripheral devices according to the fourth embodiment.

In FIG. 12, reference numeral 1 denotes a reader section which constitutes a part of the image processing apparatus of the fourth embodiment and converts an original into image data; and 2, a printer section which also forms a part of the image processing apparatus of the fourth embodiment. The arrangements of these reader and printer sections 1 and 2 are identical with those illustrated in FIG. 3.

Reference numeral 7 denotes an external apparatus which is electrically connected to the reader section 1 and has various functions (to be described later). This external apparatus 7 includes a facsimile unit 710 for performing facsimile communications; a file unit 720 for storing various data; an external memory 730 connected to the file unit 720; a computer interface 740 for connections to a computer and a LAN; a formatter 750 for converting information from the computer into visual images; an image memory 760 for storing information from the reader section 1 or temporarily storing information from the computer; and a core unit 700 for controlling these functions. Reference numeral 900 denotes a host computer for externally issuing a memory rewrite instruction to the image processing apparatus 100.

In the image processing apparatus 100 and the peripheral devices with the above arrangement, the core unit 700 of the external apparatus 7 receives a flash memory rewrite mode proceeding instruction for the image processing apparatus 100 from the host computer 900. The core unit 700 then fetches the operating state from the image processing apparatus 100 and performs the following control on the basis of the operating state of the image processing apparatus 100.

That is, the core unit 700 inhibits a rewrite action if the image processing apparatus 100 is in operation (including a copying operation, a FAX operation, and a print-out operation), or in any of an intermediate state including "paper jamming", "no paper", and "no toner", or an abnormal state such as abnormal heating of a heat roller, or a wait state at start-up. If the image processing apparatus 100 is in a state other than these states, the core unit 700 transmits a flash memory rewrite execute signal to the host computer 900.

Thereafter, the rewrite execute signal is transmitted from the host computer 900 to the image processing apparatus 100 via the core unit 700. The flash memory 602 is rewritten by the flash memory rewrite program stored in the flash memory 602 in accordance with rewrite data transmitted from the host computer 900 to the image processing apparatus 100 via the core unit 700. These control processes done by the image processing apparatus are the same as in the above embodiments and a detailed description thereof will be omitted.

The operation of the external apparatus 7 in the fourth embodiment will be described below with reference to the flow chart in FIG. 13.

Figure 13:
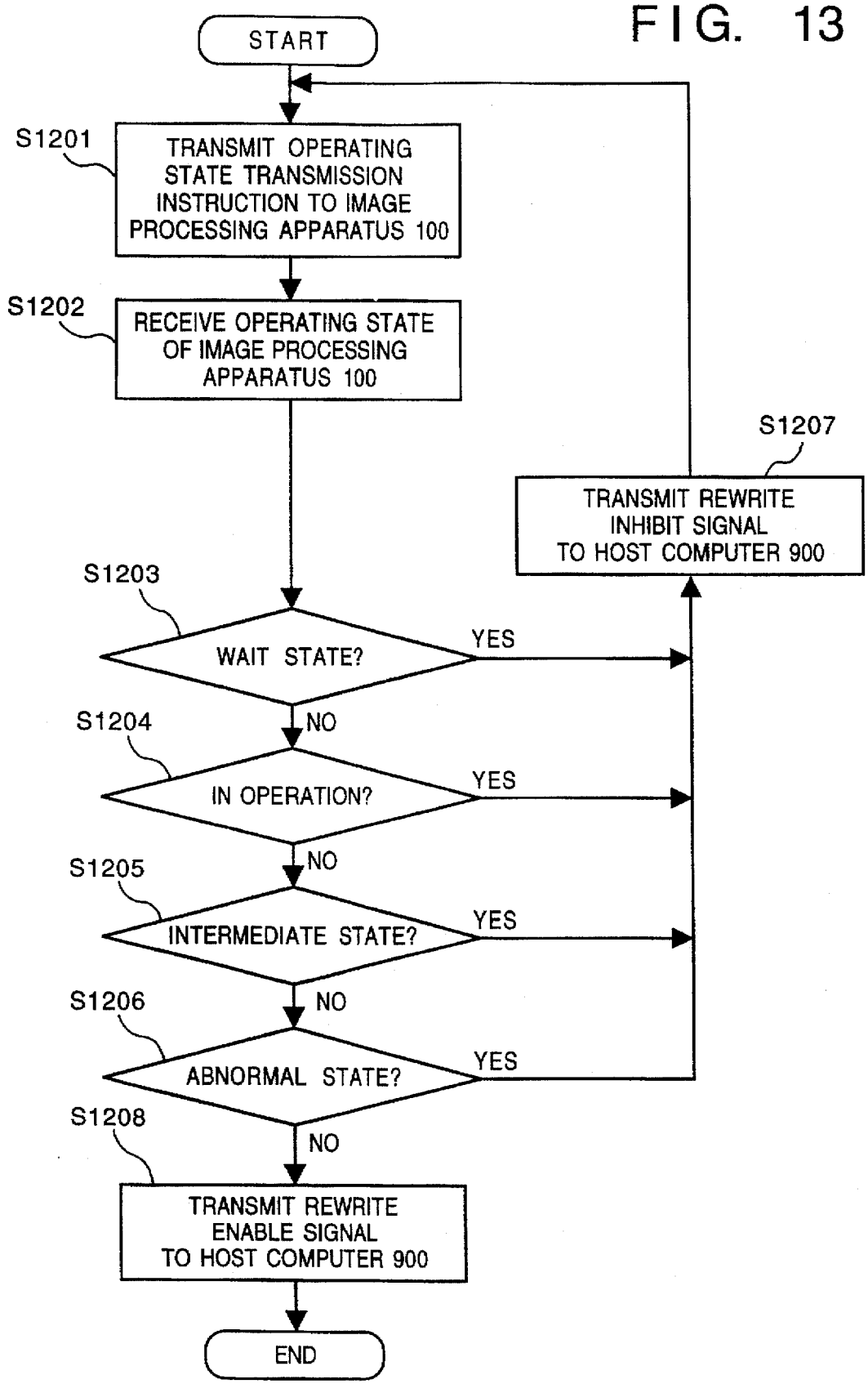
FIG. 13 is a flow chart showing the control done by an external apparatus to determine the operating state of the image processing apparatus in the fourth embodiment.

FIG. 13 is a flow chart showing the operation performed by the core unit 700 to determine the operating state of the image processing apparatus 100. As shown in FIG. 12, a program for achieving this operation is stored in the core unit 700 and started when a rewrite mode proceeding instruction is received from the host computer 900.

Referring to FIG. 13, in step S1201 the core unit 700 transmits an operating state transmission instruction to the image processing apparatus 100. Upon receiving this operating state transmission instruction, the image processing apparatus 100 self-determines the operating state in accordance with the processing shown in FIG. 11 (more specifically, control similar to the control shown in steps S501 to S508 in FIG. 5) and transmits the determination result to the external apparatus 7. The core 700 receives the operating state from the image processing apparatus 100 in step S1202 and checks the received state of the image processing apparatus 100 in steps S1203 to S1206.

In step S1203, the core unit 700 checks whether the image processing apparatus 100 is in a wait state at start-up. If the image processing apparatus 100 is in the wait state, the flow advances to step S1207, and the core unit 700 transmits a rewrite inhibit signal to the host computer 900. The flow then returns to step S1201, and the core unit 700 waits until the wait state at start-up is completed.

On the other hand, if the image processing apparatus 100 is not in the wait state in step S1203, the flow advances to step S1204, and the core unit 700 checks whether the image processing apparatus 100 is performing any of, e.g., a copying operation, a FAX operation, and a print-out operation. If the image processing apparatus is in operation, the flow advances to step S1207.

If the image processing apparatus 100 is not in operation in step S1204, the flow advances to step S1205, and the core unit 700 checks whether the image processing apparatus 100 is in an intermediate state including "paper jamming", "no paper", and "no toner". If the image processing apparatus is in an intermediate state, the flow advances to step S1207.

If the image processing apparatus 100 is not in an intermediate state in step S1205, the flow advances to step S1206, and the core unit 700 checks whether the image processing apparatus 100 is in an abnormal state which includes abnormal heating of a heat roller. If the image processing apparatus is in an abnormal state, the flow advances to step S1207.

If the image processing apparatus 100 is not in the abnormal state in S1206, i.e., if the core unit 700 determines that the apparatus is in or has reached a rewrite enable state, the flow advances to step S1208. In step S1208, the core unit 700 transmits a rewrite enable signal to the host computer 900.

Thereafter, a rewrite execute signal is transmitted from the host computer 900 to the image processing apparatus 100 via the core unit 700, and a rewrite is started by the flash memory rewrite program stored in the flash memory 602.

As described above, the core unit 700 of the external apparatus 7 checks the operating state of the image processing apparatus prior to rewriting the flash memory 602. Consequently, it is possible to prevent run away of the image processing apparatus taking place when a rewrite is performed while the apparatus is in operation. It is also possible to perform a rewrite action at the same time the rewrite enable state is set.

The present invention can be applied to a system constituted by a plurality of devices or to an apparatus comprising a single device. Furthermore, the invention is applicable also to a case where the invention is embodied by supplying a program to a system or apparatus.

According to the present invention as has been described above, the operating state of an image processing apparatus is checked before an internal memory of the apparatus is rewritten. This makes it possible to prevent run away of the image processing apparatus occurring when the nonvolatile memory is uncarefully rewritten.

For example, run away of the image processing apparatus can be effectively prevented by inhibiting a rewrite action if the image processing apparatus is in a wait state, in operation, in an intermediate state, or in an abnormal state. Furthermore, a rewrite to the nonvolatile memory is performed immediately when or a predetermined time after the above state is canceled. This enables an accurate rewrite action.

Moreover, even in altering the control procedure of the image processing apparatus, the memory need not be replaced, and a rewrite using communications from a remote plate also is possible.

Note that in the above embodiments the memory rewrite in the image processing apparatus is done in accordance with a command from the host computer, but the present invention is not limited to these embodiments. As an example, the image processing apparatus can be connected to a telephone line or a local area network, and a memory rewrite can be performed in accordance with a program transmitted from, e.g., a computer in a remote plate to the image processing apparatus through the telephone line or the local area network.

Also, the image processing apparatus subjected to a program rewrite is not restricted to a so-called digital copying machine including a reader section and a printer section, as in the embodiments. That is, it is also possible to use various image processing apparatuses such as a printer, a scanner, an electronic file, and a facsimile apparatus.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A memory management control device for managing an internal memory of an image processing apparatus, comprising:

receiving means for receiving a rewrite request from an external apparatus which supplies data to be written in the memory;

determining means for determining an operating state of said image processing apparatus upon receiving the rewrite request from the external apparatus; and control means for performing rewrite control for the memory on the basis of the result of determination by said determining means.

2. The device according to claim 1, wherein the memory is a nonvolatile memory.

3. The device according to claim 2, wherein the nonvolatile memory is a flash memory.

4. The device according to claim 1, wherein said determining means determines whether the image processing apparatus is in operation, and said control means inhibits a memory rewrite if said determining means determines that the image processing apparatus is in operation.

5. The device according to claim 1, wherein said determining means determines whether the image processing apparatus is in an intermediate state, and said control means inhibits a memory rewrite if said determining means determines that the image processing apparatus is in the intermediate state.

6. The device according to claim 1, wherein said determining means determines whether the image processing apparatus is in an abnormal state, and said control means inhibits a memory rewrite if said determining means determines that the image processing apparatus is in the abnormal state.

7. The device according to claim 1, wherein said determining means determines whether the image processing apparatus is waiting, and said control means inhibits a memory rewrite if said determining means determines that the image processing apparatus is waiting.

8. The device according to claim 1, wherein said determining means determines whether the image processing apparatus is in operation or in any of an intermediate state, an abnormal state, and a wait state, and said control means performs a memory rewrite if said determining means determines that the image processing apparatus is neither in operation nor in any of the intermediate, abnormal, and wait states.

9. The device according to claim 1, further comprising communication control means for controlling communication with an external apparatus, wherein said determining means determines the operating state of the image processing apparatus on the basis of an instruction transmitted from the external apparatus via said communication control means, thereby allowing said control means to perform the memory control.

10. The device according to claim 1, wherein if said determining means determines that the memory is in a rewrite disable state, said control means performs the rewrite control for the memory after the rewrite disable state is canceled.

11. The device according to claim 10, wherein said control means performs the rewrite control for the memory immediately after the rewrite disable state is canceled.

12. The device according to claim 1, wherein said control means writes the data supplied from said external apparatus in the memory if said determining means determines that the memory is in a rewrite enable state.

13. The device according to claim 9, further comprising operating means for inputting an operation command of the image processing apparatus, wherein if said determining means determines that the memory is in a rewrite enable state, said control means displays a message, indicating that a rewrite is to be executed, on said operating means, and rewrites the memory after confirming that no rewrite inhibit signal is input from said operating means.

14. The device according to claim 9, further comprising display means for displaying the operating state or the like data of the image processing apparatus, wherein said control means displays a message, indicating that a memory rewrite is being executed, on said display means while the memory rewrite is being executed.

15. A memory management control method of managing an internal memory of an image processing apparatus, comprising the steps of:

receiving a rewrite request from an external apparatus which supplies data to be written in the memory;

determining an operating state of the image processing apparatus upon receiving the rewrite request from the external apparatus; and performing rewrite control for the memory on the basis of the result of determination.

16. The method according to claim 15, wherein the memory is a nonvolatile memory.

17. The method according to claim 15, wherein the determination step determines whether the image processing apparatus is in operation, and a memory rewrite is inhibited if the determination step determines that the image processing apparatus is in operation.

18. The method according to claim 15, wherein the determination step determines whether the image processing apparatus is in an intermediate state, and a memory rewrite is inhibited if the determination step determines that the image processing apparatus is in the intermediate state.

19. The method according to claim 15, wherein the determination step determines whether the image processing apparatus is in an abnormal state, and a memory rewrite is inhibited if the determination step determines that the image processing apparatus is in the abnormal state.

20. The method according to claim 15, wherein the determination step determines whether the image processing apparatus is waiting, and a memory rewrite is inhibited if the determination step determines that the image processing apparatus is waiting.

21. The method according to claim 15, wherein the determination step determines whether the image processing apparatus is in operation or in any of an intermediate state, an abnormal state, and a wait state, and a memory rewrite is performed if the determination step determines that the image processing apparatus is neither in operation nor in any of the intermediate, abnormal, and wait states.

22. The method according to claim 15, further comprising a communication control step for controlling communication with an external apparatus, wherein the determination step determines the operating state of the image processing apparatus on the basis of an instruction transmitted from the external apparatus in the communication control step, thereby performing the memory control.

23. The method according to claim 15, wherein if the determination step determines that the memory is in a rewrite disable state, the rewrite control for the memory is performed after the rewrite disable state is canceled.

24. The method according to claim 23, wherein the rewrite control for the memory is performed immediately after the rewrite disable state is canceled.

25. The method according to claim 15, wherein the data supplied from the external apparatus is written in the memory if it is determined that the memory is in a rewrite enable state.

26. The method according to claim 23, wherein if the determination step determines that the memory is in a rewrite enable state, a message indicating that a rewrite is to be executed is displayed on an operation unit, and the memory is rewritten after it is confirmed that no rewrite inhibit signal is input by an operator.

27. The method according to claim 23, wherein a message indicating that a memory rewrite is being executed is displayed on an operation unit while the memory rewrite is being executed.

28. The apparatus according to claim 1, wherein
a rewrite region of the memory stores an operation control procedure of the image processing apparatus, and
the operation control procedure of the image processing apparatus is rewritten.

29. The method according to claim 15, wherein
a rewrite region of the memory stores an operation control procedure of the image processing apparatus, and
the operation control procedure of the image processing apparatus is rewritten.

30. The method according to claim 16, wherein the nonvolatile memory is a flash memory.

31. A memory management control device for managing an internal memory of an image processing apparatus, comprising:
receiving means for receiving a rewrite request from an external apparatus which supplies data to be written in the memory;
determining means for determining an operating state of the image processing apparatus;
checking means for checking the result of determination by said determining means upon receiving the rewrite request from the external apparatus; and
control means for performing rewrite control for the memory on the basis of the checking result provided by said checking means.

32. The device according to claim 31, wherein the memory is a nonvolatile memory.

33. The device according to claim 32, wherein the nonvolatile memory is a flash memory.

34. The device according to claim 31, wherein said determining means determines whether the image processing apparatus is in operation.

35. The device according to claim 31, wherein said determining means determines whether or not the image processing apparatus is in an intermediate state.

36. The device according to claim 31, wherein said determining means determines whether or not the image processing apparatus is in an abnormal state.

37. The device according to claim 31, wherein said determining means determines whether or not the image processing apparatus is in a waiting state.

38. The device according to claim 31, wherein said determining means determines whether or not the image processing apparatus is in operation or in any of an intermediate state, an abnormal state, and a waiting state,
and wherein said checking means determines whether or not the memory is in a rewrite enable state by checking the result of determination by said determining means.

39. The device according to claim 31, further comprising communication control means for controlling communication with the external apparatus,
wherein said checking means checks the result of determination by said determination means, on the basis of an instruction transmitted from the external apparatus via said communication control means.

40. The device according to claim 31, wherein if said determining means determines that the memory is in a rewrite enable state, said determining means sets rewrite enable status.

41. The device according to claim 40, wherein said checking means checks whether or not the rewrite enable status is set by said determining means.

42. The device according to claim 40, wherein said determining means sets rewrite enable status when a predetermined time has elapsed since determination of the rewrite enable state of the memory by said determination means.

43. A memory management control method of managing an internal memory of an image processing apparatus, comprising the steps of:
receiving a rewrite request from an external apparatus which supplies data to be written in the memory;
determining an operating state of the image processing apparatus;
checking the result of determination obtained in said determining step upon receiving the rewrite request from the external apparatus; and
performing rewrite control for the memory on the basis of the result of checking.

44. The method according to claim 43, wherein the memory is a nonvolatile memory.

45. The method according to claim 44, wherein the nonvolatile memory is a flash memory.

46. The method according to claim 43, wherein, in said determining step, a determination is made as to whether or not the image processing apparatus is in operation.

47. The method according to claim 43, wherein, in said determining step, a determination is made as to whether or not said image processing apparatus is in an intermediate state.

48. The method according to claim 43, wherein, in said determining step, a determination is made as to whether or not the image processing apparatus is in an abnormal state.

49. The method according to claim 43, wherein, in said determining step, a determination is made as to whether or not the image processing apparatus is in a waiting state.

50. The method according to claim 43, wherein, in said determining step, a determination is made as to whether or not the image processing apparatus is in an operation state or in any of an intermediate state, an abnormal state, and a waiting state,
and wherein, in said checking step, a determination is made as to whether or not the memory is in a rewrite enable state by checking the result of determination obtained in said determining step.

51. The method according to claim 43, further comprising a communication control step of controlling communication with the external apparatus,
wherein, in said checking step, the result of determination is checked on the basis of an instruction transmitted from the external apparatus in said communication control step.

52. The method according to claim 43, wherein if it is determined in said determination step that the memory is in a rewrite enable state, rewrite enable status is set in said determining step.

53. The method according to claim 52, wherein in said checking step, a check is made as whether or not the rewrite enable status is set.

54. The method according to claim 52, wherein in said determining step, rewrite enable status is set when a predetermined time has elapsed since determination of the rewrite enable status in said determination step.

55. A memory management control device for managing an internal memory of an image processing apparatus, comprising:

receiving means for receiving a rewrite request from an external apparatus which supplies data to be written in the memory;

determining means for determining an operating state of the image processing apparatus;

transmitting means for transmitting the result of determination by said determining means to the external apparatus upon receiving the rewrite request from the external apparatus; and control means for performing rewrite control for the memory on the basis of an instruction from said external apparatus to which the result of determination has been transmitted.

56. The device according to claim 55, wherein the memory is a nonvolatile memory.

57. The device according to claim 55, wherein the nonvolatile memory is a flash memory.

58. The device according to claim 55, wherein the determining means determines whether said image processing apparatus is in operation.

59. The device according to claim 55, wherein said determining means determines whether or not the image processing apparatus is in an intermediate state.

60. The device according to claim 55, wherein said determining means determines whether or not the image processing apparatus is an abnormal state.

61. The device according to claim 55, wherein said determining means determines whether or not the image processing apparatus is in a waiting state.

62. The device according to claim 55, wherein said external apparatus determines whether or not the memory is in a rewrite enable state on the basis of the result of determination transmitted from said transmitting means.

63. The device according to claim 55, further comprising communication control means for controlling communication with the external apparatus, wherein said transmitting means transmits the result of determination by said determination means on the basis of the rewrite request transmitted from the external apparatus via said communication control means.

64. The device according to claim 61, wherein if the external apparatus determines that the memory is in a rewrite enable state, the external apparatus transmits the instruction indicating the start of the rewrite control.

65. A memory management control method of managing an internal memory of an image processing apparatus, comprising the steps of:

receiving a rewrite request from an external apparatus which supplies data to be written in the memory;

determining an operating state of the image processing apparatus;

transmitting the result of determination obtained in said determining step to the external apparatus upon receiving the rewrite request from the external apparatus; and performing rewrite control for the memory on the basis of an instruction from the external apparatus to which the result of determination has been transmitted.

66. The method according to claim 65, wherein the memory is a nonvolatile memory.

67. The method according to claim 65, wherein the nonvolatile memory is a flash memory.

68. The method according to claim 65, wherein, in said determining step, a determination is made as to whether or not the image processing apparatus is in operation.

69. The method according to claim 65, wherein, in said determining step, a determination is made as to whether or not the image processing apparatus is in an intermediate state.

70. The method according to claim 65, wherein, in said determining step, a determination is made as to whether or not the image processing apparatus is in an abnormal state.

71. The method according to claim 65, wherein, in said determining step, a determination is made as to whether or not said image processing apparatus is in a waiting state.

72. The method according to claim 65, wherein the external apparatus determines whether or not the memory is in a rewrite enable state on the basis of the result of determination transmitted in said transmitting step.

73. The method according to claim 65, further comprising a communication control step of controlling communication with the external apparatus, wherein, in said transmitting step, the result of determination is transmitted on the basis of the rewrite request transmitted from the external apparatus in said communication step.

74. The method according to claim 72, wherein if the external apparatus determines that the memory is in a rewrite enable state, the external apparatus transmits the instruction indicating the start of the rewrite control.

* * * * *

UNITED STATES PATENT AND TRADEMARK OFFICE
CERTIFICATE OF CORRECTION

PATENT NO. : 5,699,546

DATED : December 16, 1997

INVENTOR(S): AKINOBU NISHIKATA ET AL.

It is certified that error appears in the above-identified patent and that said Letters Patent is hereby corrected as shown below:

SHEET 5

FIG. 5, "IS IT" should read --IT IS--.

SHEET 11

FIG. 12, "OPEARATING" should read --OPERATING--.

COLUMN 6

Line 43, "toner"" should read --toner".--.

COLUMN 9

Line 39, "state" should read --status--.

COLUMN 12

Line 58, "any of" should be deleted.

UNITED STATES PATENT AND TRADEMARK OFFICE
CERTIFICATE OF CORRECTION

PATENT NO. : 5,699,546

DATED : December 16, 1997

INVENTOR(S): AKINOBU NISHIKATA ET AL.

It is certified that error appears in the above-identified patent and that said Letters Patent is hereby corrected as shown below:

COLUMN 19

Line 6, "as" should read --as to--.

Signed and Sealed this

Seventh Day of July, 1998

Attest:

BRUCE LEHMAN

Attesting Officer

Commissioner of Patents and Trademarks